(No Model.)
M. SCHNEIDER.
LUBRICATING VALVE.
No. 311,379. Patented Jan. 27, 1885.
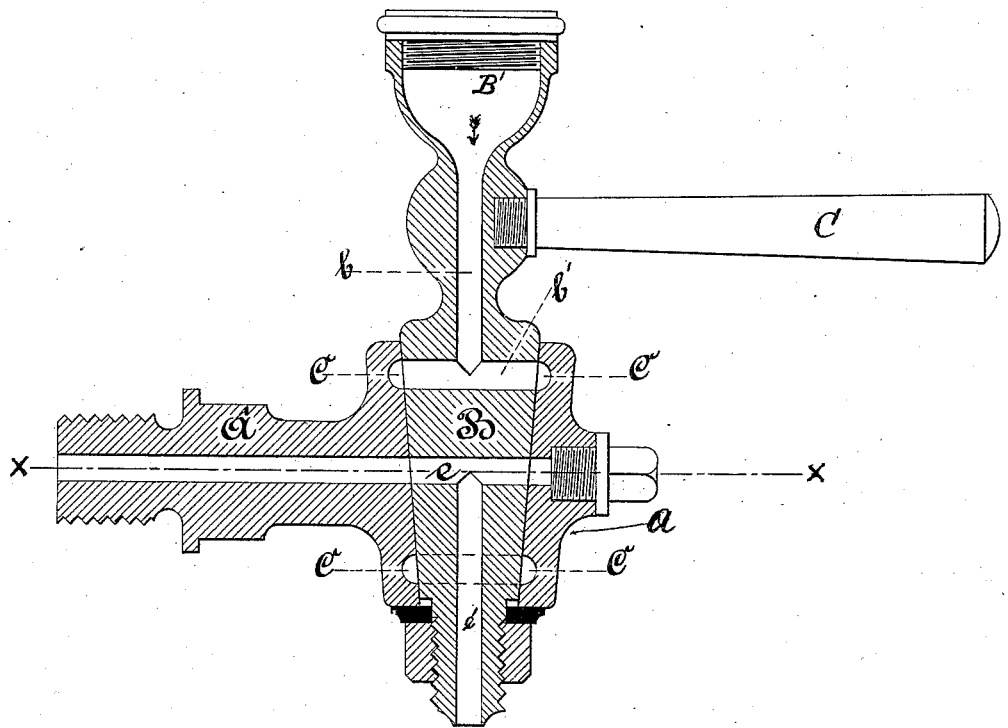
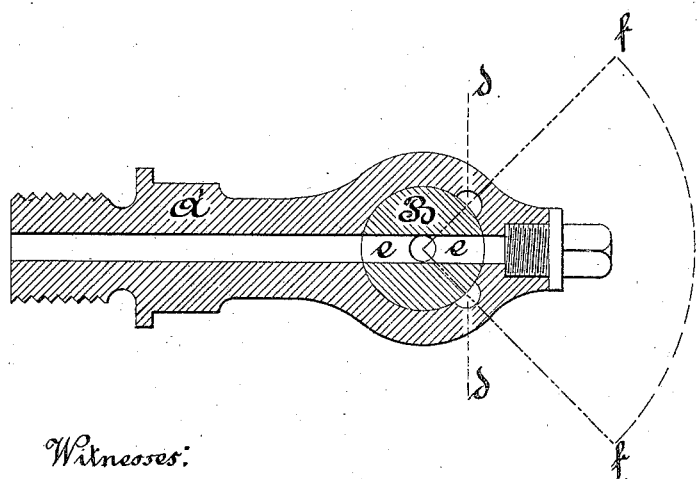
Witnesses:
Adolph Schlesinger
Paul Rossmann
Inventor:
Max Schneider

UNITED STATES PATENT OFFICE.

MAX SCHNEIDER, OF DOOS, BAVARIA, GERMANY.

LUBRICATING-VALVE.

SPECIFICATION forming part of Letters Patent No. 311,379, dated January 27, 1885.

Application filed July 16, 1884. (No model.) Patented in Germany January 18, 1883, No. 23,535.

*To all whom it may concern:*

Be it known that I, MAX SCHNEIDER, a subject of the King of Bavaria, residing at Doos, Bavaria, have invented certain new and useful Improvements in Cocks with Lubricating Appliances, of which the following is a specification, reference being had therein to the accompanying drawings.

In the accompanying drawings, Figure 1 represents a vertical longitudinal section through a cock or faucet embodying my invention; and Fig. 2 represents a horizontal section through the same on the line $x\ x$ of Fig. 1, the outlet tube of the faucet being omitted.

A designates the casing of the faucet or cock, provided with the horizontal outlet-tube A', Fig. 1; and B, the rotary plug provided with a transverse outlet-passage, $e$, registering with said outlet-tube, and also with a supplemental communicating outlet-passage, $e'$, through which water may drip out of the faucet. In said casing, above and below said passage $e$, are two annular grooves, $c\ c'$, the upper one of which, $c$, registers with a horizontal transverse channel, $b'$, formed in said plug. A vertical channel, $b$, extends from said horizontal channel $b'$ up to a lubricating-chamber, B', formed in an upward extension of said plug. Vertical channels $d\ d$, formed in the said casing A, Fig. 2, allow the lubricant to pass from channel $b'$ down to channel $c'$. The plug B is turned by a handle, C, the oil or other lubricant flowing down from reservoir B' through channels $b, b', c, d$, and $c'$, effectually lubricating the cock or faucet both above and below the passage or channel $e$.

Having thus described my invention, what I claim as new, and desire to secure by Letters Patent, is—

1. A faucet-casing provided with lubricating-channels arranged, respectively, above and below the outlet-passage of the plug, and provided with means of communication, in combination with a plug turning in said casing, and means of supplying lubricants to said channels, substantially as set forth.

2. A rotary faucet-plug, B, provided with a lubricant-chamber, B', and passages $b\ b'$, for conducting the oil downward therefrom, in combination with casing A, provided with an annular channel, $c$, communicating with channel $b'$, before the outlet-passage of the plug, a similar channel, $c'$, below said passage, and vertical channels $d$, which allow the oil to pass from channel $c$ down to channel $c'$, substantially as and for the purpose set forth.

MAX SCHNEIDER.

Witnesses:
 L. REISSMANN,
 ADOLPH SCHLESINGER.